US 6,657,754 B2

(12) United States Patent
Rapkin et al.

(10) Patent No.: US 6,657,754 B2
(45) Date of Patent: Dec. 2, 2003

(54) PASSIVELY ENERGIZED FLOATING GUIDE

(75) Inventors: Alan E. Rapkin, Pittsford, NY (US);
Richard G. Luther, Hamlin, NY (US);
Morris A. Karski, Victor, NY (US);
Anton Suk, Rochester, NY (US)

(73) Assignee: Heidelberger Druckmaschinen AG, Heidelberg (DE)

( * ) Notice: Subject to any disclaimer, the term of this patent is extended or adjusted under 35 U.S.C. 154(b) by 5 days.

(21) Appl. No.: 09/860,198

(22) Filed: May 17, 2001

(65) Prior Publication Data

US 2001/0043370 A1 Nov. 22, 2001

Related U.S. Application Data

(60) Provisional application No. 60/205,018, filed on May 17, 2000.

(51) Int. Cl.[7] .................................................. H04N 1/04
(52) U.S. Cl. ........................................ 358/496; 358/498
(58) Field of Search ................................ 358/498, 496, 358/400

(56) References Cited

U.S. PATENT DOCUMENTS 5,102,115 A * 4/1992 Takamizawa ............... 271/121
5,130,807 A * 7/1992 Tanabe et al. .............. 358/296
5,233,400 A * 8/1993 Cahill ........................ 355/317
5,680,203 A * 10/1997 Kobayashi et al. ........... 355/76
5,717,505 A * 2/1998 Chang et al. ............... 358/498

FOREIGN PATENT DOCUMENTS

JP 9-86702 * 3/1997 ............ B65H/3/52

* cited by examiner

Primary Examiner—Jerome Grant, II
(74) Attorney, Agent, or Firm—Kathleen K. Bowen

(57) ABSTRACT

This is a passively energized floating guide for a parked head scanner having a scanning glass slit. This floating guide applies pressure to the original papers crossing the scanning glass slit in order to wipe the scanning glass slit, and keep it free from contamination. The floating guide comprises a wiper bar which is pivotally mounted above the scanning glass slit such that it extends from end to end of the scanning glass slit, and it rests on the scanning glass slit when at rest. The weight and pivot point for the wiper bar are chosen such that the force of the original paper rotates the wiper bar and causes the wiper bar to press down on the original as it passes between the wiper bar and the scanning glass slit with sufficient force to clean the glass, but not enough force to jam the paper. This is the case even for lightweight papers. After the paper has passed, the wiper bar pivots back to its initial position.

7 Claims, 2 Drawing Sheets

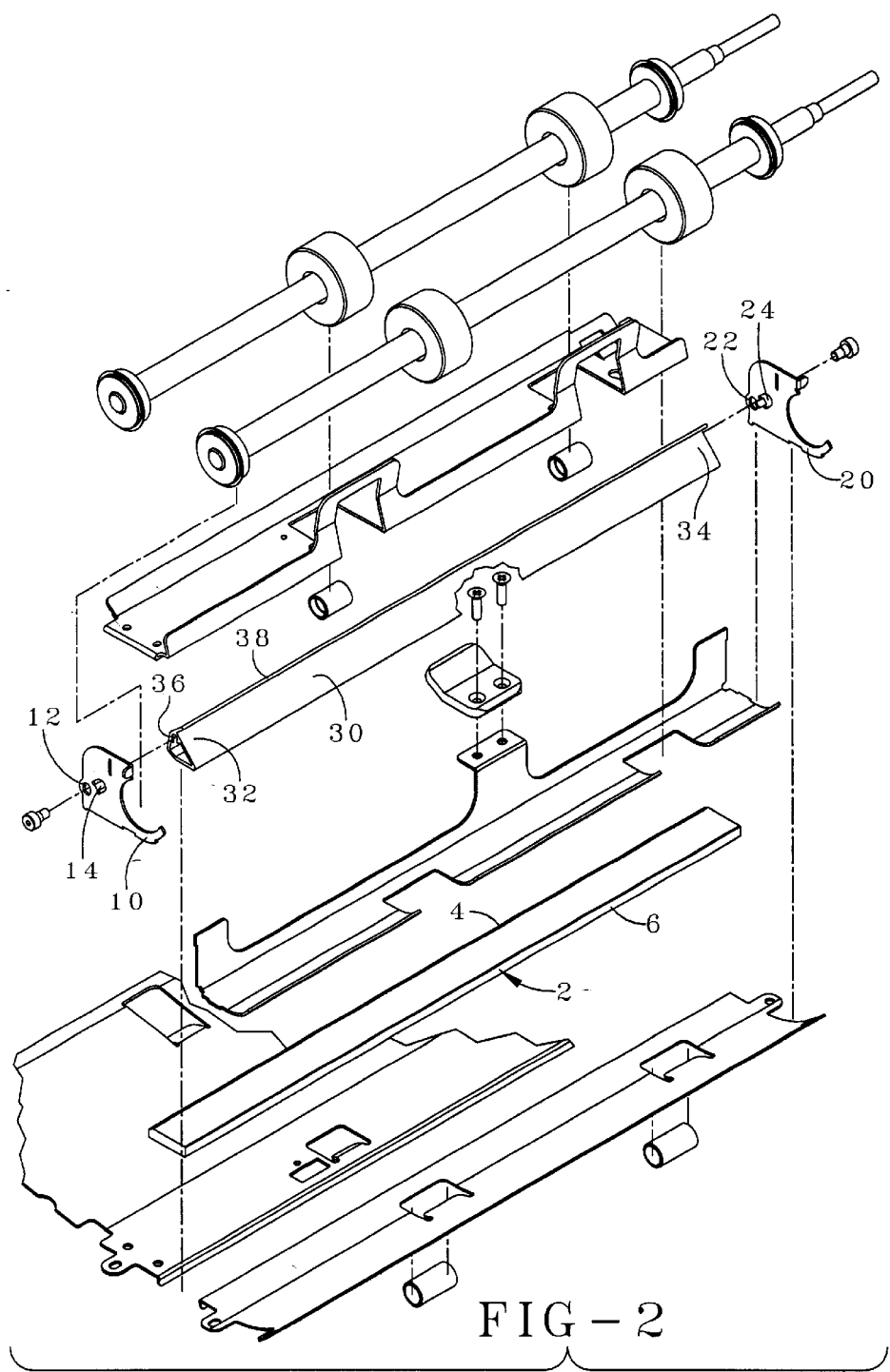

PASSIVELY ENERGIZED FLOATING GUIDE

This application claims the benefit of U.S. Provisional Application No. 60/205,018, filed May 17, 2000.

BACKGROUND

The present invention relates to the field of copiers and scanners, and is particularly useful for digital electro photographic machines.

When scanning a document in a parked head scanner, contamination on the scanning glass slit can result in undesirable effects on the copies produced. Such contamination can result from paper dust, toner, etc. Prior art has used the original itself to wipe the scanning glass clean as it is transported across the scanning glass slit. However the weight of the paper itself is not always sufficient to clean the glass. Guides have been employed to apply pressure to the originals as they pass over the scanning glass slit, however to avoid jamming the lightweight paper, these guides have had clearance between the guide and the scanning glass slit. Because of this, lightweight paper is not effectively cleaning the glass.

A floating guide is desired which could apply pressure to a full range of papers, including lightweight papers, without jamming the lightweight papers.

SUMMARY OF THE INVENTION

There is a passively energized floating guide in a parked head scanner, which enables the original paper to clean the scanning glass slit. The scanning glass slit has an end one and an end two which are longitudinally opposing ends and wherein the paper crosses the scanning glass slit latitudinally moving from the entrance side to the exit side. The passively energized floating guide comprises an end plate one, an end plate two, and a wiper bar. The end plate one has a slot one, and is mounted to the scanner at the scanning glass slit end one. The end plate two has a slot two, and is mounted to the scanner at the scanning glass slit end two.

The wiper bar has a wiper bar end one and an opposing wiper bar end two, and has a pivot point. The wiper bar end one is pivotally attached at the pivot point to the end plate one through slot one, and the wiper bar end two is pivotally attached at the pivot point to the end plate two through slot two such that when at rest, the wiper bar rests on the scanning glass slit. The wiper bar weight, shape, and pivot point are chosen such that as paper passes over the scanning glass slit, the force of the paper causes the wiper bar to rotate slightly allowing paper to pass between the wiper bar and the scanning glass slit, and passively energizes the wiper bar such that it applies pressure on the paper.

BRIEF DESCRIPTION OF THE DRAWINGS

FIG. 2 is an exploded isometric view of a passively energized floating guide according to an aspect of the invention.

DETAILED DESCRIPTION

Figure 1:
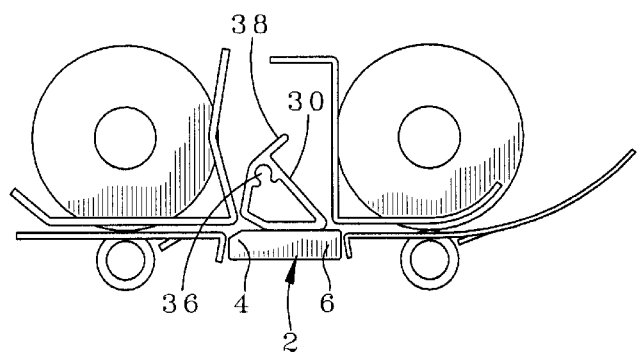
FIG. 1 is an end view of a passively energized floating guide according to an aspect of the invention.
Figure 3:
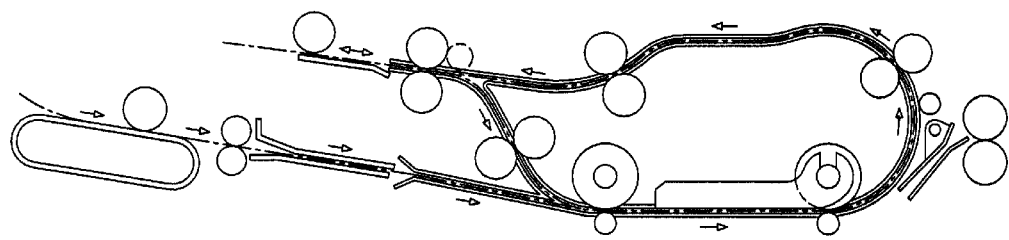
FIG. 3 is a diagram of the paper path through a scanner according to an aspect of the invention.

Various aspects of the invention are presented in FIGS. 1–4 which are not drawn to scale and in which like components are numbered alike. Referring now to FIG. 1, according to an aspect of the invention, there is a passively energized floating guide 1 in a parked head scanner, which enables the original paper to clean the scanning glass slit 2.

The scanning glass slit 2 has an end one 8 and an end two 9 which are longitudinally opposing ends and wherein the paper crosses the scanning glass slit 2 latitudinally moving from the entrance side 4 to the exit side 6. The passively energized floating guide comprises an end plate one 10, an end plate two 20, and a wiper bar 30. The end plate one 10 has a slot one 12, and is mounted to the scanner at the scanning glass slit end one 8. The end plate two 20 has a slot two 22, and is mounted to the scanner at the scanning glass slit end two 9.

The wiper bar 30 has a wiper bar end one 32 and an opposing wiper bar end two 34, and has a pivot point 36. The wiper bar end one 32 is pivotally attached at the pivot point 36 to the end plate one 10 through slot one 12, and the wiper bar end two 34 is pivotally attached at the pivot point 36 to the end plate two 20 through slot two 22 such that when at rest, the wiper bar 30 rests on the scanning glass slit 2. The wiper bar 30 weight, shape, and pivot point 36 are chosen such that as paper passes over the scanning glass slit 2, the force of the paper causes the wiper bar 30 to rotate slightly allowing paper to pass between the wiper bar 30 and the scanning glass slit 2 and passively energizes the wiper bar 30 such that it applies pressure on the paper.

In another embodiment of the invention, the pivot point 36 is chosen such that greater than 50% of the weight of the wiper bar 30 is on the exit side 6 of the pivot point 36.

According to a further aspect of the invention, when the scanner is at rest, the wiper bar 30 rests on the scanning glass slit 2 at a resting point 35 on the exit side 6 of the pivot point 36, and the wiper bar 30 angles upward from the resting point 35 towards the entrance side 4 of the scanning glass slit 2.

In a further embodiment of the invention, the wiper bar 30 weight does not exceed 3.5 ounces when used with paper ranging from 16 lbs to 110 lbs weight. In order to keep the weight of the wiper bar 30 low, in a preferred embodiment of the invention the wiper bar 30 is aluminum.

In a further preferred embodiment of the invention, end plate one 10 and end plate two 20 have a stop one 14 and a stop two 24 respectively. In this embodiment, the wiper bar 30 has a protrusion 38, such that the wiper bar protrusion 38 will hit the stop one 14 and the stop two 24 if the wiper bar 30 is rotated far enough, such that the wiper bar 30 does not over-rotate.

According to a further aspect of the invention, there is a method for preventing contamination build-up on a parked scanning head scanner glass slit 2. This method comprises applying pressure to the original paper as it passes over the scanning glass slit 2 such that the original paper wipes the scanning glass slit 2 clean as it passes over the scanning glass slit 2, wherein such pressure is applied using a floating guide 1 which is passively energized by the frictional force of the original paper.

In a preferred embodiment of this invention the wiper bar 30 has a roughly trapezoidal shape (although no two sides are exactly parallel), wherein the trapezoidal shape is constructed of 0.07-inch thick aluminum. In this embodiment, the wiper bar 30 also has an approximately 0.22 inch protrusion 38 which is approximately 0.06 inches thick, which comes off the pivot point 32 on the longest side of the trapezoidal shape. The trapezoidal shape and the protrusion 38 are extruded as one piece. The side of the wiper bar 30 which rests on the glass is approximately 0.5 inches long.

The side of the wiper bar 30 which angles upward from the resting point 35 towards the entrance side 4 of the scanning glass slit 2 angles upward from the scanning glass slit 2 at approximately 30°, and the angled portion is approximately 0.23 inches long. The longest side of the wiper bar angles upward from the rear of the resting side of the wiper bar, to the pivot point, at approximately a 49° angle with the scanning glass slit 2 surface, and is approximately 0.73 inches long.

What is claimed is:

1. Passively energized floating guide in a parked head scanner, to enable the original paper to clean a scanning glass slit wherein the scanning glass slit has a first end and a second end which are longitudinally opposing ends and wherein the paper crosses the scanning glass slit latitudinally moving from an entrance side to an exit side, comprising:

a first end-plate one having a first slot, mounted to the scanner at the scanning glass slit first end;

a second end plate having a second slot, mounted to the scanner at the scanning glass slit second end; and, a wiper bar having a wiper bar first end and an opposing wiper bar second end, and having a pivot point, wherein said wiper bar first end is pivotally attached at said pivot point to said first end-plate through said first slot, and said wiper bar second end is pivotally attached at said pivot point to said second end-plate through said second slot such that when at rest, said wiper bar rests on the scanning glass slit, wherein as paper passes over the scanning glass slit, the force of the paper causes said wiper bar to rotate slightly allowing paper to pass between said wiper bar and the scanning glass slit and passively energizes the wiper bar such that it applies pressure on the paper.

2. The passively energized floating guide of claim 1 wherein said pivot point is chosen such that greater than 50% of the weight of said wiper bar is on the exit side of said pivot point.

3. The passively energized floating guide of claim 1 wherein when the scanner is at rest, said wiper bar rests on the scanning glass slit on the exit side of said pivot point, and said wiper bar angles upward from the resting point towards the entrance side of the scanning glass slit.

4. The passively energized floating guide of claim 1 wherein the wiper bar weight does not exceed 3.5 ounces when used with paper ranging from 16 lbs to 110 lbs weight.

5. The passively energized floating guide of claim 1 wherein said wiper bar is aluminum.

6. The passively energized floating guide of claim 1 wherein said first end-plate and second end-plate have a first stop and a second stop respectively, and wherein said wiper bar has a protrusion, such that said wiper bar protrusion will hit said first stop and said second stop if said wiper bar is rotated far enough, such that said wiper bar does not over-rotate.

7. A method for preventing contamination build-up on a parked scanning head scanner glass slit, comprising:

applying pressure to the original paper as it passes over the scanning glass slit such that the original paper wipes the scanning glass clean as it passes over the scanning glass slit, wherein such pressure is applied using a floating guide which is passively energized by the frictional force of the original paper.

* * * * *